(12) United States Patent
Rofougaran

(10) Patent No.: US 9,112,586 B2
(45) Date of Patent: Aug. 18, 2015

(54) RADIO CIRCUITS AND COMPONENTS THEREOF INCLUDING TEMPERATURE RESPONSIVE LIQUID MEMS

(71) Applicant: Broadcom Corporation, Irvine, CA (US)

(72) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 276 days.

(21) Appl. No.: 13/717,544

(22) Filed: Dec. 17, 2012

(65) Prior Publication Data

US 2014/0073265 A1  Mar. 13, 2014

Related U.S. Application Data

(60) Provisional application No. 61/699,183, filed on Sep. 10, 2012, provisional application No. 61/727,068, filed on Nov. 15, 2012.

(51) Int. Cl.
*H04B 1/44* (2006.01)
*H04M 1/00* (2006.01)
(Continued)

(52) U.S. Cl.
CPC .............. *H04B 1/40* (2013.01); *H01G 5/0132* (2013.01); *H01G 5/16* (2013.01); *H01H 2029/008* (2013.01)

(58) Field of Classification Search
CPC ........... H04B 1/006; H04B 1/40; H04B 1/44; H01G 5/0132; H01H 2029/008
USPC ............ 455/73, 78, 550.1, 552.1, 553.1, 132, 455/133, 188.1, 193.1; 330/41, 127, 199; 257/714, 205, 245, 287, 798; 716/100, 716/126, 137, 138
See application file for complete search history.

(56) References Cited

U.S. PATENT DOCUMENTS

2004/0150939 A1  8/2004 Huff
2006/0211163 A1*  9/2006 Ouellet et al. ................... 438/50
(Continued)

FOREIGN PATENT DOCUMENTS

EP  1214854 A1  6/2002

OTHER PUBLICATIONS

Simon et al., "A Liquid-Filled Microrelay with a Moving Mercury Microdrop," Journal of Microelectromechanical Systems, vol. 6, No. 3, Sep. 1997; 9 pgs.
(Continued)

*Primary Examiner* — Andrew Wendell
(74) *Attorney, Agent, or Firm* — Garlick & Markison; Bruce E. Garlick

(57) ABSTRACT

A radio circuit includes an adjustable RF front-end module on an IC die, a liquid MEMS component on a board, and a processing module on the IC die. The adjustable RF front-end module adjusts processing of an inbound or an outbound RF signal based on a compensation control signal. The liquid MEMS component changes an operational characteristic as temperature of the radio circuit varies. The processing module generates the compensation signal based on the changing of the operational characteristic of the liquid MEMS component. The liquid MEMS component includes a channel within the board, a liquid droplet contained within the channel, and one or more conductive elements proximal to the channel.

20 Claims, 13 Drawing Sheets

(51) Int. Cl.
| | |
|---|---|
| *H03F 3/04* | (2006.01) |
| *H01L 27/118* | (2006.01) |
| *G06F 17/50* | (2006.01) |
| *H04B 1/40* | (2015.01) |
| *H01G 5/16* | (2006.01) |
| *H01G 5/013* | (2006.01) |
| *H01H 29/00* | (2006.01) |

(56) References Cited

U.S. PATENT DOCUMENTS

| | | |
|---|---|---|
| 2007/0042802 A1 | 2/2007 | Park et al. |
| 2007/0125178 A1* | 6/2007 | Rosenau et al. ............ 73/724 |
| 2008/0179696 A1* | 7/2008 | Chen et al. ................ 257/415 |

OTHER PUBLICATIONS

Sen, P.; Chang-Jin Kim, "A Liquid-Metal RF MEMS Switch with DC-to-40 GHz Performance," Micro Electro Mechanical Systems, 2009. MEMS 2009. IEEE 22nd International Conference on, pp. 904-907, Jan. 25-29, 2009; 4 pgs.

Kondoh et al., "High-Reliability, High-Performance RF Micromachined Switch Using Liquid Metal," Journal of Microelectromechanical Systems, vol. 14, No. 2, Apr. 2005; 7 pgs.

Chung-Hao Chen; Peroulis, D., "Liquid RF MEMS Wideband Reflective and Absorptive Switches," Microwave Theory and Techniques, IEEE Transactions on, vol. 55, No. 12, pp. 2919-2929, Dec. 2007; 11 pgs.

Varadan, V. K., Vinoy, K.J. and Jose, K.A., "Microelectromechanical Systems (MEMS) and Radio Frequency MEMS, in RF MEMS and Their Applications," John Wiley & Sons, Ltd, Chichester, UK; pp. 1-49, May 2003; 49 pgs.

European Patent Office; European Search Report; EP Application No. 13004226.0; Nov. 22, 2013; 4 pgs.

Traille et al.; A Wireless Passive RCS-Based Temperature Sensor Using Liquid Metal and Microfluidics Technologies; Oct. 10, 2011; pp. 45-48; 2011 41st European Microwave Conference.

Sen et al.; A Liquid-Solid Direct Contact Low-Loss RF Micro Switch; IEEE Journal of Microelectromechanical Systems; Oct. 1, 2009; pp. 990-997; vol. 18, No. 5.

Sen et al.; Electrostatic Fringe-Field Actuation for Liquid-Metal Droplets; Jun. 5, 2005; pp. 705-708; vol. 1, No. 5; 13th International Conference on Solid-State Sensors, Actuators and Microsystems.

Latorre et al.; Electrostatic Actuation of Microscale Liquid-Metal Droplets; Journal of Microelectromechanical Systems; Aug. 1, 2002; pp. 302-308; vol. 11, No. 4.

European Patent Office; European Search Report; EP Application No. 13004236.9; Nov. 22, 2013; 4 pgs.

\* cited by examiner

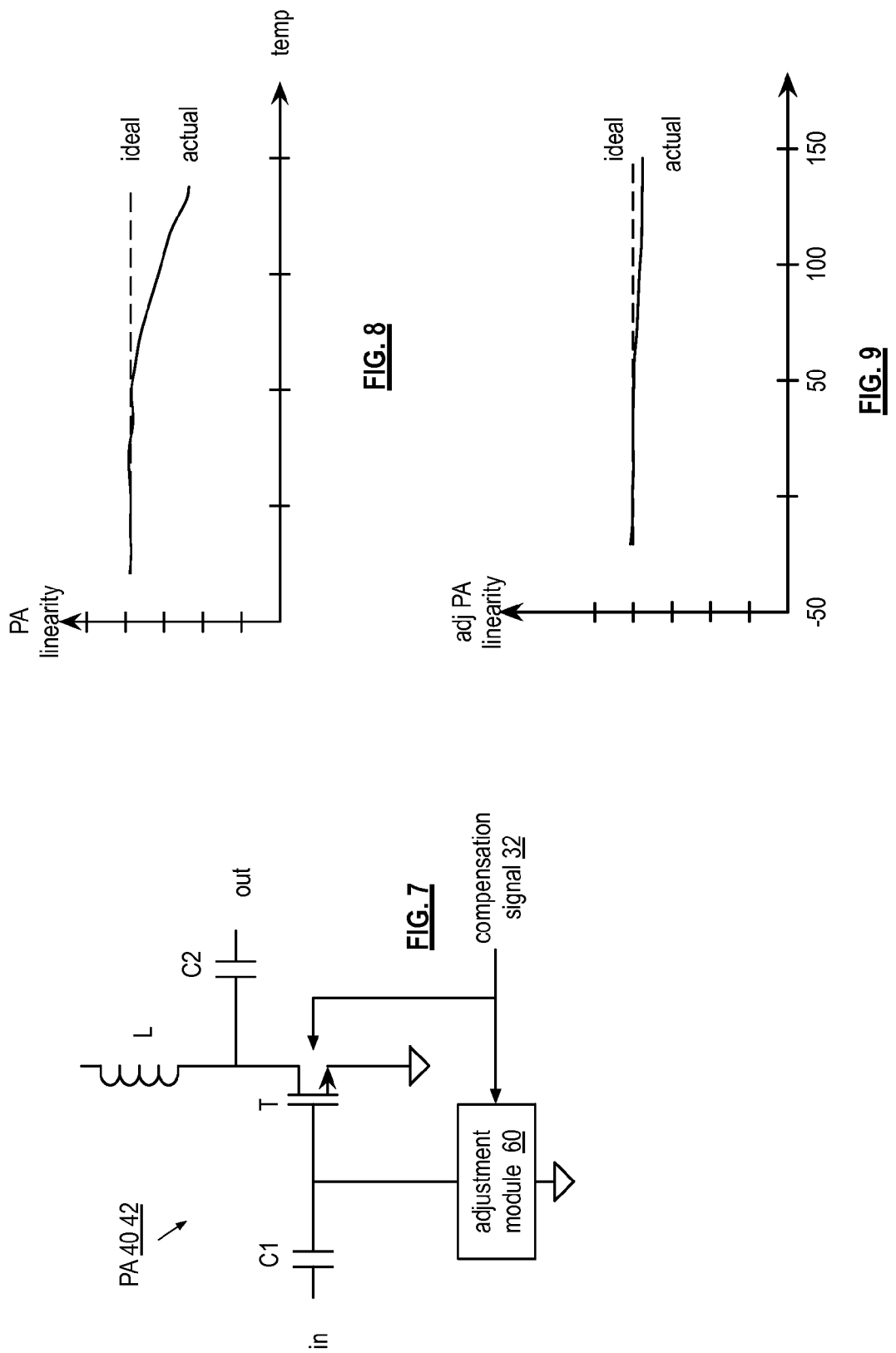

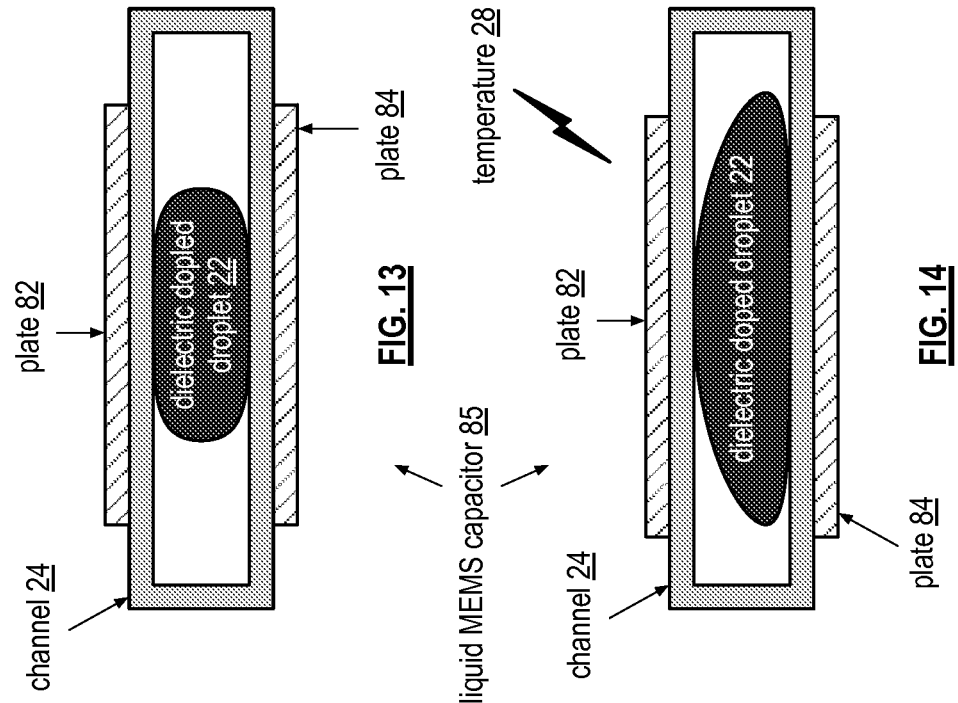
FIG. 13
FIG. 14
liquid MEMS capacitor 85
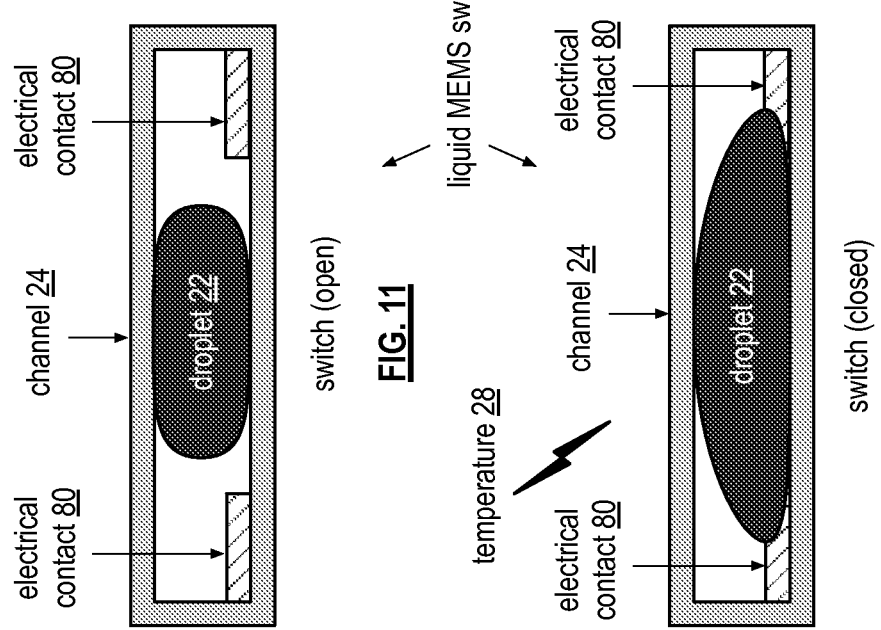
FIG. 11
FIG. 12
liquid MEMS switch 75

RADIO CIRCUITS AND COMPONENTS THEREOF INCLUDING TEMPERATURE RESPONSIVE LIQUID MEMS

CROSS REFERENCE TO RELATED PATENTS

The present U.S. Utility patent application claims priority pursuant to 35 U.S.C. §119(e) to the following U.S. Provisional Applications which are incorporated herein by reference in their entirety and made part of the present U.S. Utility patent application for all purposes:
1. U.S. Provisional Application No. 61/699,183, entitled "Liquid Micro Electro Mechanical Systems (MEMS) Devices and Applications," filed Sep. 10, 2012, and
2. U.S. Provisional Application No. 61/727,068, entitled "Radio Circuits and Components Thereof Including Temperature Responsive Liquid MEMS," filed Nov. 15, 2012.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to radio communications and more particularly to wireless communication devices utilizing one or more liquid MEMS components.

2. Description of Related Art

Radio frequency (RF) communication devices are known to facilitate wireless communications in one or more frequency bands in accordance with one or more wireless communication protocols or standards. To accommodate multiple communication protocols, or standards, an RF communication device includes multiple versions (one for each protocol) of each section of the RF communication device (e.g., baseband processing, RF receiver, RF transmitter, antenna interface) and/or includes programmable sections. For example, an RF communication device may include a programmable baseband section, multiple RF receiver sections, multiple RF transmitter sections, and a programmable antenna interface.

To provide at least some of the programmable capabilities of a programmable section of an RF communication device, the section includes one or more programmable circuits, wherein the programmability is achieved via a switch-based bank of circuit elements (e.g., capacitors, inductors, resistors). For instance, selecting various combinations of a switch-based bank of capacitors and switch-based bank of inductors yields various resonant tank circuits that can be used in filters, as loads in amplifiers, etc. A recent advance in RF technology is to use integrated circuit (IC) micro-electro-mechanical system (MEMS) switches to provide the switches of a switch-based bank of circuit elements.

Issues with IC MEMS switches include minimal contact areas (which creates heat spots), bouncing of electrical contact (which limits use to cold switching), and a limited life cycle. In response to these issues, more recent advances in RF technology employ IC implemented liquid RF MEMS switches (which may also be referred to as electro-chemical wetting switches). As IC fabrication technologies continue to evolve and reduce the size of IC dies and components fabricated thereon, IC implemented liquid RF MEMS switches may have limited applications.

BRIEF DESCRIPTION OF THE SEVERAL VIEWS OF THE DRAWING(S)

FIG. 7 is a schematic block diagram of another embodiment of a power amplifier in accordance with the present invention;

FIG. 8 is a graph of an example of an uncompensated power amplifier's linearity versus temperature in accordance with the present invention;

FIG. 9 is a graph of an example of a compensated power amplifier's linearity versus temperature in accordance with the present invention;

FIGS. 11 and 12 are schematic block diagrams of an embodiment of a liquid MEMS switch in accordance with the present invention;

FIGS. 13 and 14 are schematic block diagrams of an embodiment of a liquid MEMS capacitor in accordance with the present invention;

DETAILED DESCRIPTION OF THE INVENTION

Figure 1:
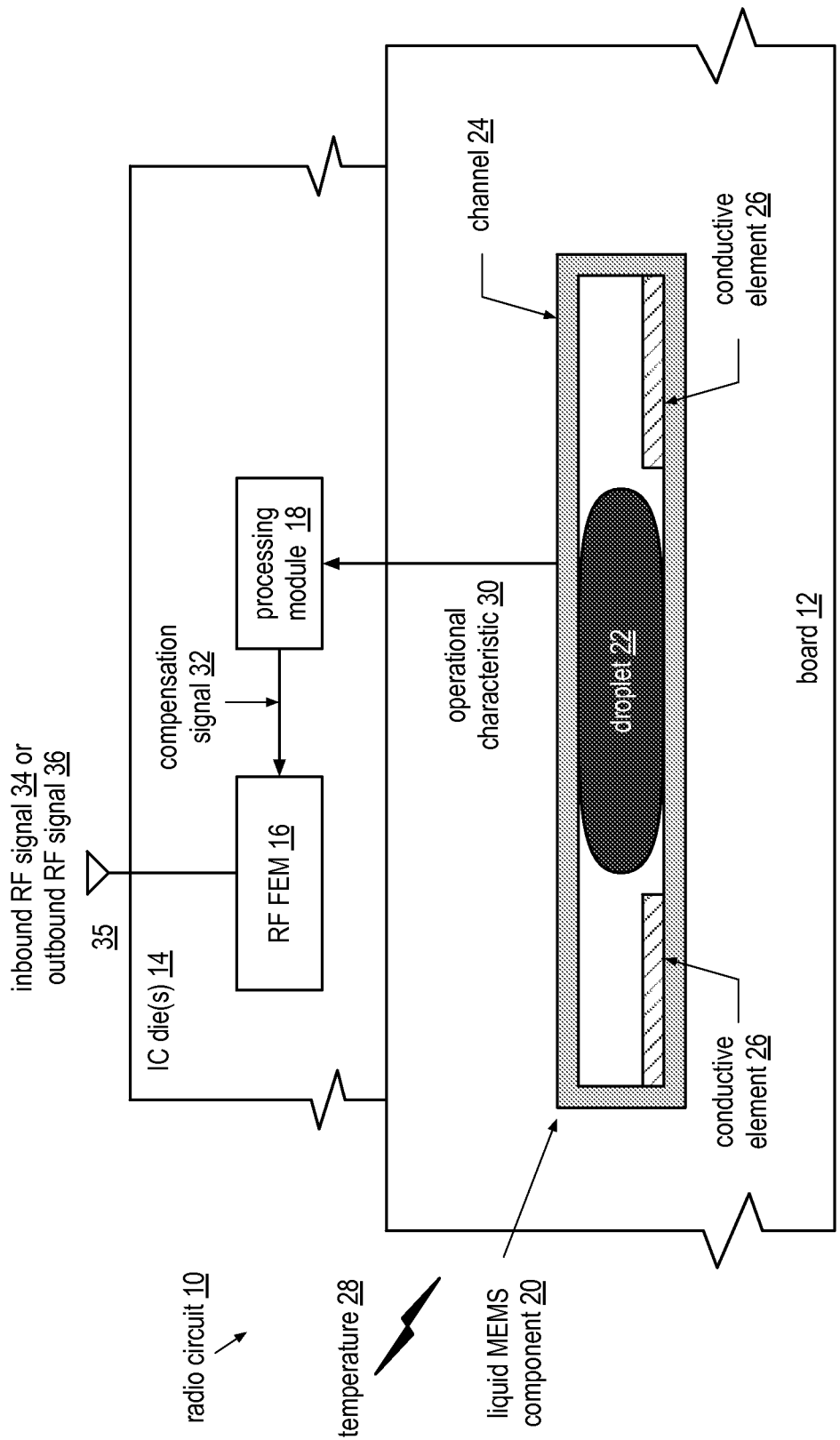
FIG. 1 is a schematic block diagram of an embodiment of a radio circuit in accordance with the present invention.

FIG. 1 is a schematic block diagram of an embodiment of a radio circuit 10 that may be used in portable computing communication devices. A portable computing communication device may be any device that can be carried by a person, can be at least partially powered by a battery, includes a radio transceiver (e.g., radio frequency (RF) and/or millimeter wave (MMW)) and performs one or more software applications. For example, the portable computing communication device may be a cellular telephone, a laptop computer, a personal digital assistant, a video game console, a video game player, a personal entertainment unit, a tablet computer, etc.

As shown, the radio circuit 10 includes one or more integrated circuit (IC) dies 14 and a board 16. The IC die(s) 14 include an adjustable radio frequency (RF) front-end module 16 and a processing module 18. The board 16 supports, at least indirectly, the IC die(s) 14 and includes one or more liquid micro-electro-mechanical system (MEMS) components 20. A liquid MEMS component 20 includes a liquid droplet 22, a channel 24, and one or more conductive elements 26. The droplet 22 may be one or more of an electrically conductive droplet (e.g., mercury or other metal or electrically conductive substance that is in a liquid state at room temperature), a liquid insulating droplet, a dielectric doped droplet, or other type of solution. Regardless of the particular composition of the droplet 22, the droplet 22 changes its size, shape, position with respect to the one or more conductive elements 26 in response to varying temperatures.

The channel 24 contains the droplet 22 and it may have a variety of shapes. For example, the channel 24 may have a square-tubular shape, a cylinder shape, a non-linear square-tubular shape, or a non-linear cylinder shape, where non-linear refers to the axial shape of the channel being something other than a straight line (e.g., a meandering line, an arc, a circle, an ellipse, a polygon, or a portion thereof). In addition, the channel 24 may have its internal and/or external walls coated with an insulating layer, dielectric layer, a semiconductor layer, and/or a conductive layer.

In an example of operation, the front-end module (RF FEM) 16 is coupled to an antenna structure 35, which may include one or more antennas, an antenna array, etc., to transceive inbound and outbound RF signals 34 and 36. As the front-end module 16 transceives the inbound and outbound RF signals 34 and 36, the temperature of the radio circuit 10 varies. For example, as the transmit power increases to transmit the outbound RF signals 36, the front-end module 16 generates more heat, which increases the temperature of the radio circuit 10. As the temperature increases, performance of one or more components of the front-end module 16 drifts from an ideal performance level.

To compensate for a temperature dependent performance drift of the front-end module 16, the on-board 12 liquid MEMS component 20 changes an operation characteristic (e.g., on/off state of one or more switches, capacitance, dielectric properties of a capacitor, etc.) proportion to the temperature change. For example, when the temperature of the radio circuit 10 varies, the liquid droplet 22 changes its size, shape or position with respect to the one or more conductive elements 26 thereby changing the operational characteristic 30 of the liquid MEMS component 20.

The processing module 18 interprets the change in the operational characteristic 30 to generate a compensation signal 32. For example, the larger the temperature change (e.g., from a nominal ambient temperature to over 100 degrees Celsius), the greater the change in the operational characteristic 30. Accordingly, the processing module 18 generates a larger compensation signal 32. The adjustable RF front-end module 16 adjusts its processing of the inbound and/or outbound RF signals 34 and 36 based on the compensation signal to substantially compensation for the temperature dependent performance drift.

As shown, the liquid MEMS component(s) 20 are supported by the board 12, which may be a printed circuit board (PCB), an integrated circuit (IC) package substrate, a redistribution layer (RDL) of the PCB or of the IC package substrate, etc. The liquid MEMS component(s) 20 may be fabricated into the board 12 or may be separate components embedded into the board 12. By implementing the liquid MEMS component(s) 20 on a board 12 instead of an IC die 14, the size of a liquid MEMS component 20 may be tens, hundreds, or thousands of times larger than a corresponding component implemented on an IC die, which allows for components that are impractical to near impossible to implement on an IC, especially with newer IC fabrication processes, to be readily implemented on a board.

Figure 2:
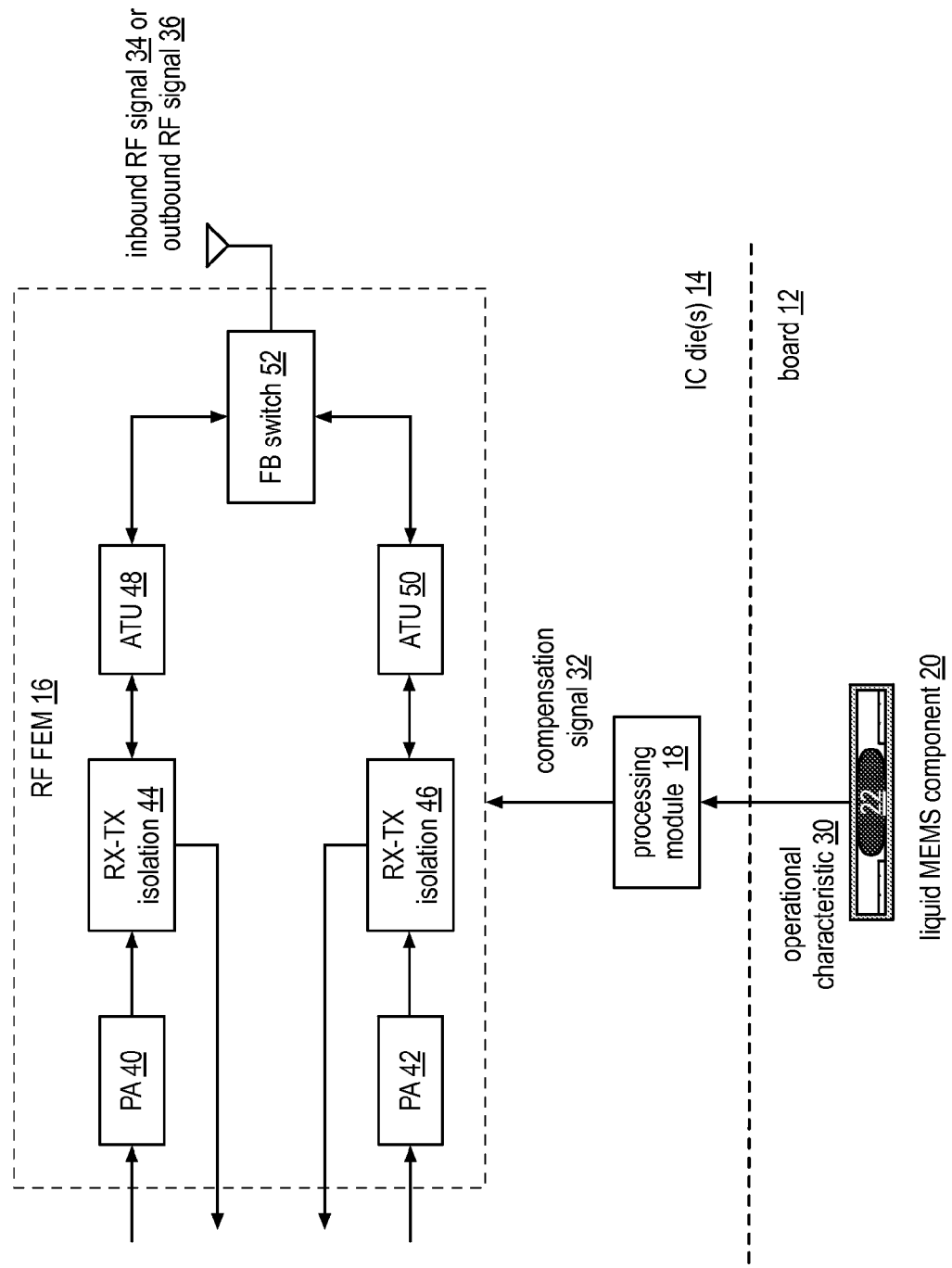
FIG. 2 is a schematic block diagram of another embodiment of a radio circuit in accordance with the present invention.

FIG. 2 is a schematic block diagram of another embodiment of a radio circuit 20 that includes the RF front-end module (RF FEM) 16 and the processing module 18 on one or more IC dies 14 and a liquid MEMS component 20 on a board 12. The RF FEM 26 includes power amplifiers (PA) 40-42, receive-transmit isolation modules 44-46, antenna tuning units (ATU) 48-50, and a frequency band (FB) switch 52.

In an example of operation, as the temperature of the radio circuit 10 varies, the liquid MEMS component 20 changes an operational characteristic 30. The processing module 18 interprets the operational characteristic 30 and generates, therefrom, a compensation signal 32 corresponding to the variation in temperature. In response to the compensation signal 32, the front-end module 16 adjusts its processing of the inbound and/or outbound RF signals by adjusting an operational property (e.g., linearity, gain, biasing, load, frequency band, etc.) of the one or more power amplifiers, by changing from a first channel to a second channel within a frequency band, and/or by changing from a first frequency band to a second frequency band.

For example, the processing module 18 may interpret the change in the operational characteristic 30 as being too large for the given operating conditions of the radio circuit (e.g., for the given operating conditions, the temperature should not be as high as the change in the operational characteristic is representing). In this instance, the processing module 18 may deduce that the temperature is too high because of an issue transmitting or receiving on a current channel or within a current frequency band. As such, the processing module 18 would generate the compensation signal 32 to instruct the RF FEM 16 to retune to a different channel or a different frequency band.

As another example, the processing module 18 may interpret the change in the operational characteristics 30 as an indication to adjust an operational property of one or more of the power amplifiers 40-42. In this instance, the processing module 18 generates the compensation signal 32 to adjust gain, biasing, load, linearity, and/or frequency band of operation for the one or more power amplifiers 40-42.

Figure 3:
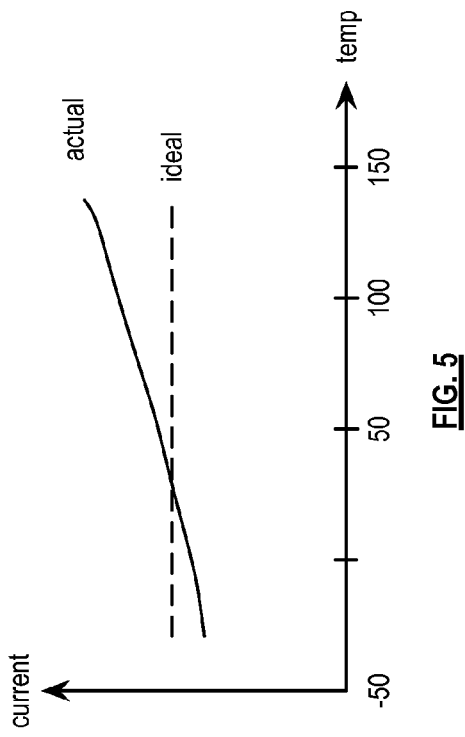
FIG. 3 is a schematic block diagram of an embodiment of a power amplifier in accordance with the present invention.

FIG. 3 is a schematic block diagram of an embodiment of a single-ended power amplifier 40-42 that includes a transistor (T), a load (which is represented as an inductor L), an input capacitor (C1), an output capacitor (C2), and an adjustment module 60. The adjustment module 60 may adjust the gain of the power amplifier and/or adjust the bias current of the power amplifier in response to the compensation signal 32. Note that for a differential power amplifier, the single-ended version is mirrored where the adjustment module 60 collectively adjusts the bias current of the two sides and individually adjusts the gain of the two sides.

Figure 4:
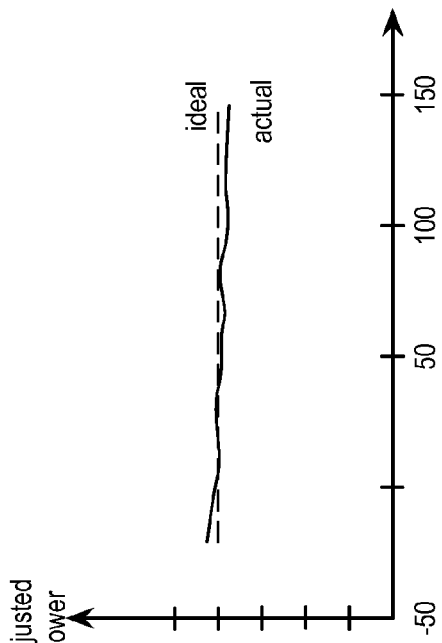
FIG. 4 is a graph of an example of an uncompensated power amplifier's output power versus temperature in accordance with the present invention.
Figure 5:
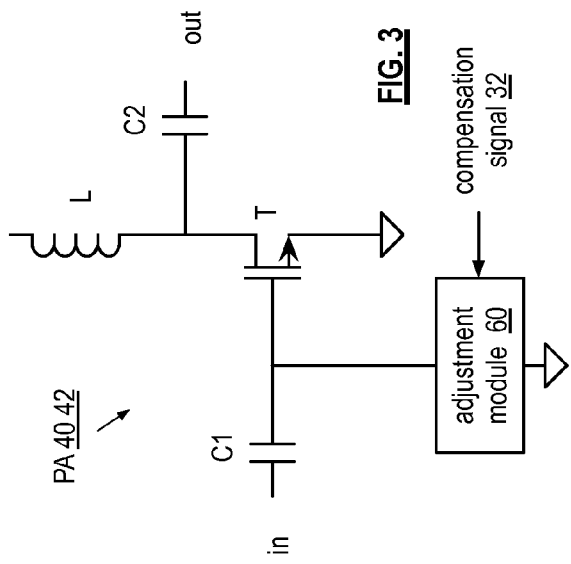
FIG. 5 is a graph of an example of a compensating current versus temperature for a power amplifier in accordance with the present invention.
Figure 6:
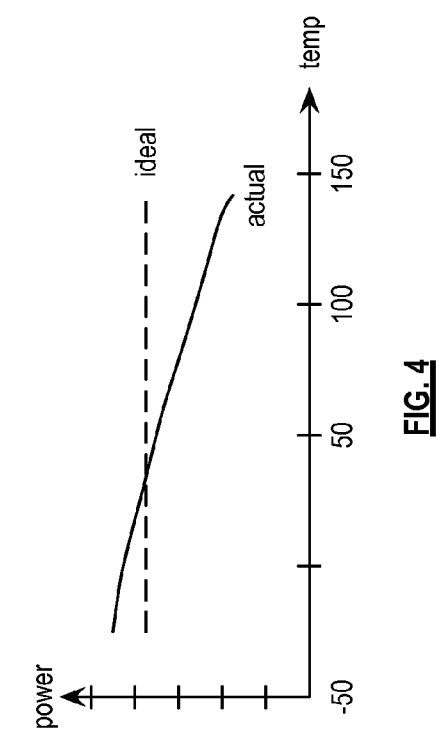
FIG. 6 is a graph of an example of a compensated power amplifier's output power versus temperature in accordance with the present invention.

For example and as shown in FIG. 4, the output power of an uncompensated power amplifier (e.g., adjustment module is not changing the bias current and/or the gain) decreases as the temperature increases. To maintain an output power that more closely resembles the ideal output power, the bias current needs to be adjusted as shown in FIG. 5. Accordingly, in one instance, the adjustment module 60 adjusts the bias current in accordance with the curve of FIG. 5 based on the compensation signal 32 to produce a more ideal output power as shown in FIG. 6.

FIG. 7 is a schematic block diagram of another embodiment of a single-ended power amplifier 40-42 that includes a transistor (T), a load (which is represented as an inductor L), an input capacitor (C1), an output capacitor (C2), and an adjustment module 60. The adjustment module 60 may adjust the gain of the power amplifier, adjust the bias current of the power amplifier, and/or adjust properties (e.g., on resistance, gain, drain current, characteristic curves, etc.) of the input transistor (T) in response to the compensation signal 32. Note that for a differential power amplifier, the single-ended version is mirrored where the adjustment module 60 collectively adjusts the bias current of the two sides, individually adjusts the gain of the two sides, and individually adjusts the input transistors of the two sides.

For example and as shown in FIG. 8, the linearity (e.g., ratio of output power to input power) of an uncompensated power amplifier (e.g., adjustment module is not changing the bias current and/or the gain) decreases as the temperature increases. To maintain linearity that more closely resembles the ideal linearity, the bias current, gain, and/or input transistor may be adjusted. Accordingly, the adjustment module 60 adjusts the bias current, the gain, and/or the input transistor based on the compensation signal 32 to produce a more ideal linearity as shown in FIG. 9.

Figure 10:
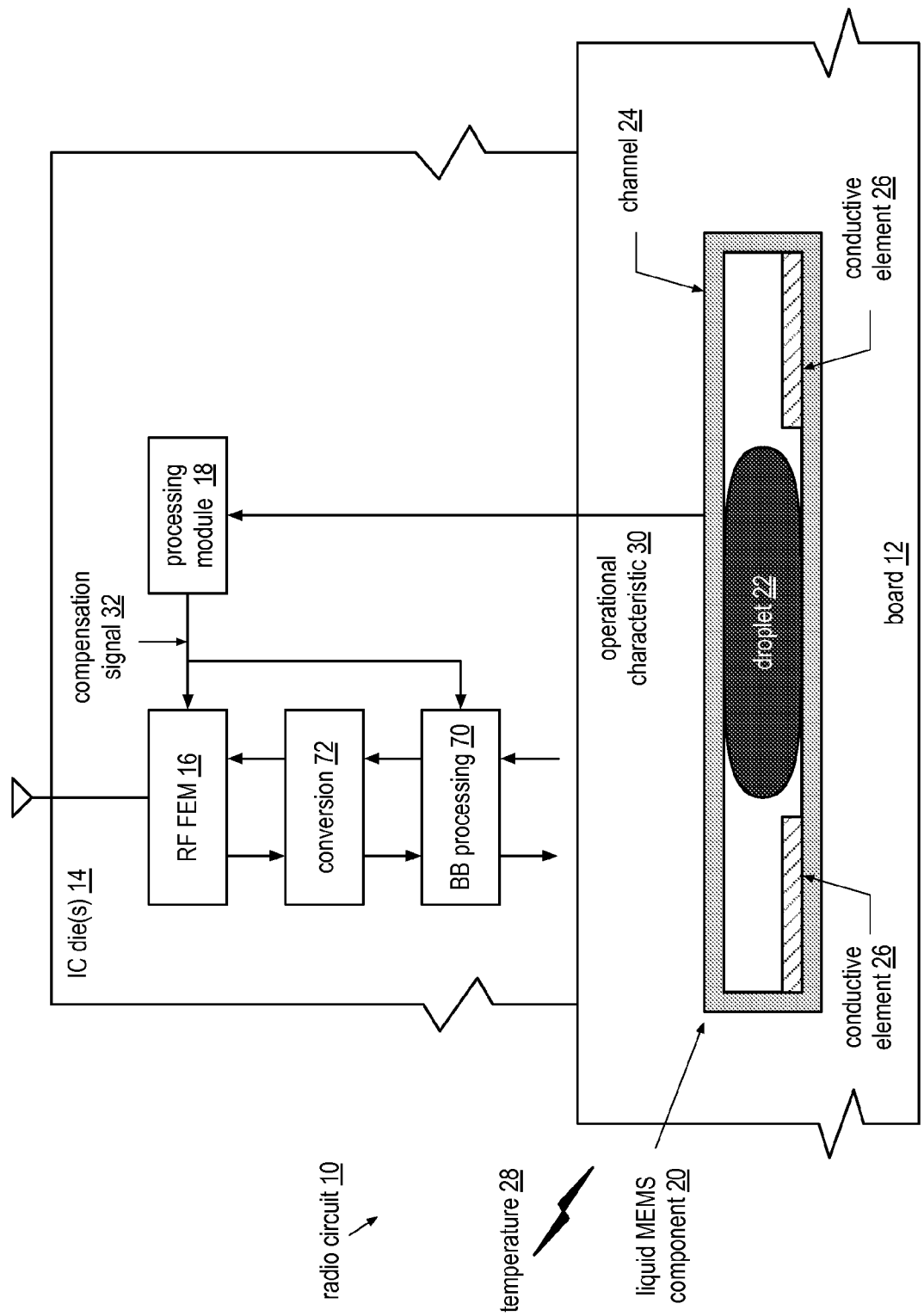
FIG. 10 is a schematic block diagram of another embodiment of a radio circuit in accordance with the present invention.

FIG. 10 is a schematic block diagram of another embodiment of a radio circuit 10 that includes one or more integrated circuit (IC) dies 14 and a board 16. The IC die(s) 14 include an adjustable radio frequency (RF) front-end module 16, a baseband processing module 70, a conversion module 72, and a processing module 18. The board 16 supports, at least indirectly, the IC die(s) 14 and includes one or more liquid micro-electro-mechanical system (MEMS) components 20. A liquid MEMS component 20 includes a liquid droplet 22, a channel 24, and one or more conductive elements 26.

In an example of operation, the baseband processing module 70 converts outbound data (e.g., voice, text, data, video, graphics, audio, etc.) into an outbound symbol stream in accordance with one of a plurality of communication protocols (e.g., IEEE 802.11, Bluetooth, global system for mobile communications (GSM), code division multiple access (CDMA), radio frequency identification (RFID), Enhanced Data rates for GSM Evolution (EDGE), General Packet Radio Service (GPRS), WCDMA, high-speed downlink packet access (HSDPA), high-speed uplink packet access (HSUPA), LTE (Long Term Evolution), WiMAX (worldwide interoperability for microwave access), and/or variations thereof). The conversion module 72 up-converts the outbound symbol stream into an up-converted analog signal, which the front-end module 16 processes into an outbound RF signal.

The baseband processing module 70 also converts an inbound symbol stream into inbound data in accordance with the one of the plurality of communication protocols. In this instance, the front-end module 16 processes an inbound RF signal to produce a received RF signal. The conversion module 72 converts the received RF signal into the inbound symbol stream.

In response to the compensation signal 32, the baseband processing module 70 changes from the current communication protocol to another one of the plurality of communication protocols. In this instance, the front-end module 16 is also adjusted to accommodate the newly selected communication protocol.

In another example, the baseband processing module 70 changes between using Cartesian coordinates and Polar coordinates for the inbound and outbound symbol streams in response to the compensation signal 32. The front-end module 16 is adjusted accordingly. In general, a Cartesian based RF transmitter provides the advantage of a single side band transmitter (i.e., do not have negative frequencies with I and Q signals), but the transmitter path (i.e., the mixing section and the power amplifier) needs to be linear to avoid loss of data resolution. A Polar coordinate RF transmitter provides the advantages of reduced RF filtering due to the response of the PLL and the use of a non-linear power amplifier (which, for the same die area, is capable of greater output power than a linear power amplifier), however, the response of the PLL is narrow, thus limiting the RF transmitter to narrow band uses. As such, the processing module 18 generates the compensation signal 32 to convert between Cartesian coordinates and Polar coordinates based on its interpretation of the change of the operational characteristic 30.

FIGS. 11 and 12 are schematic block diagrams of an embodiment of a liquid MEMS switch 75 that includes the droplet 22, the channel 24, and electrical contacts 80. The droplet 22 is electrically conductive and its shape changes in as the temperature varies. For example, with a nominal temperature, the droplet 22 is not in contact with one or more of the electrical contracts 80. As such the switch is open as shown in FIG. 11. When the temperature increases to a certain level (e.g., over 100 degrees Celsius), the size, shape, and/or position of the droplet 22 changes causing it to make contact with the electrical contracts 80. As such, the switch is closed as shown in FIG. 12. Note that the liquid MEMS component 20 may include one or more liquid MEMS switches 75.

FIGS. 13 and 14 are schematic block diagrams of an embodiment of a liquid MEMS capacitor 85 that includes a channel 24, a dielectric doped droplet 22, and capacitive plates 82-84. The dielectric doped droplet 22 includes a non-conductive liquid solution (e.g., magnetically and/or electrically inert liquid, gel, oil, etc.) and a plurality of dielectric particles suspending in the liquid solution. The particles may be porcelain, glass, and/or plastic particles. Note that the non-conductive liquid solution has a density that enables suspension of the particles. Further note that the particles may be coated with a material to reduce their individual densities. Alternatively, the dielectric doped droplet 22 may be a liquid colloid of the non-conductive liquid solution and the particles or a hydrocolloid that includes the particles.

As shown in FIG. 13, when the temperature For example, the droplet 22 is in a contracted shape, which provides a first dielectric property for the capacitor 85. When the temperature increases to a certain level as shown in FIG. 14, the shape of the droplet 22 changes, which changes the dielectric properties of the capacitor. Note that the capacitance of a capacitor is $C = \in_r \in_0 (A/d)$, where C is the capacitance, A is the area of overlap of the two plates, $\in_r$ is the relative static permittivity (e.g., dielectric constant) of the material between the plates, $\in_0$ is the electric constant, and d is the distance between the two plates. As such, by changing the dielectric properties, the dielectric constant is changed, which proportionally changes the capacitance. Further note that the liquid MEMS component 20 may include one or more liquid MEMS capacitors 85.

Figure 15:
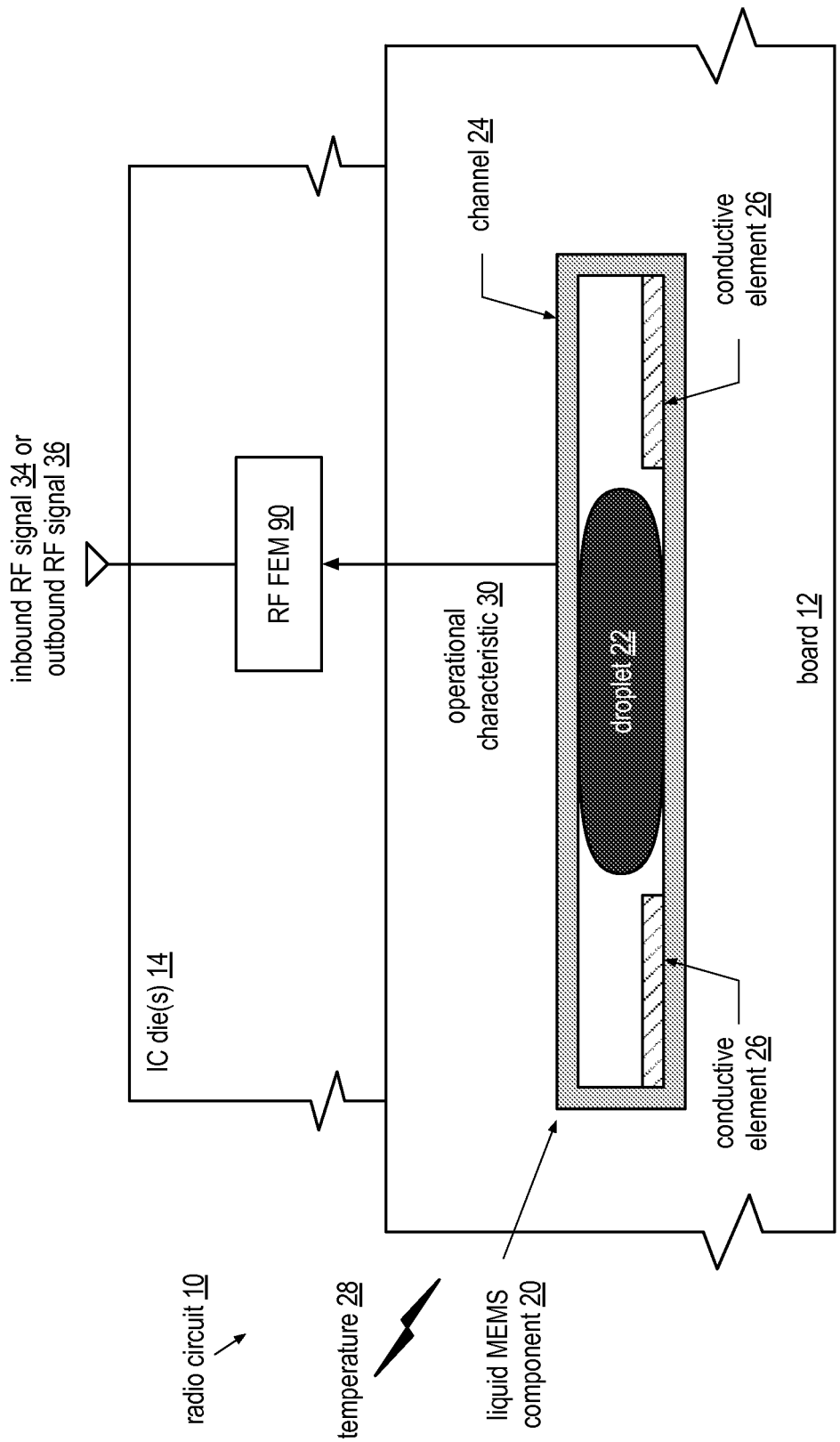
FIG. 15 is a schematic block diagram of another embodiment of a radio circuit in accordance with the present invention.

FIG. 15 is a schematic block diagram of another embodiment of a radio circuit 10 that includes a board 12 and one or more IC dies 14. The board 12 supports the IC die(s) 14 and includes one or more liquid micro-electro-mechanical system (MEMS) components 20. The IC die(s) 14 includes an adjustable radio frequency (RF) front-end module 90. A liquid MEMS component 20 includes the channel 24, the droplet 22, and conductive elements 26. The adjustable RF front-end module 90 includes one or more power amplifiers 40-42, one or more receive-transmit isolation modules 44-46, one or more antenna tuning units 48-50, and a frequency band switch 52.

In an example of operation, as the temperature of the radio circuit 10 varies, the liquid droplet 22 changes size, shape, and/or position with respect to the one or more conductive elements 26 thereby changing an operational characteristic of the liquid MEMS component 10. The adjustable RF front-end module 90 adjusts its processing of an inbound or an outbound RF signal based on the operational characteristics of the one or more liquid MEMS components 20 changing. For instance, the adjustable RF front-end module 90 adjusts an operational property of the one or more power amplifiers, changes from a first channel to a second channel within a frequency band, and/or changes from a first frequency band to a second frequency band.

Figure 16:
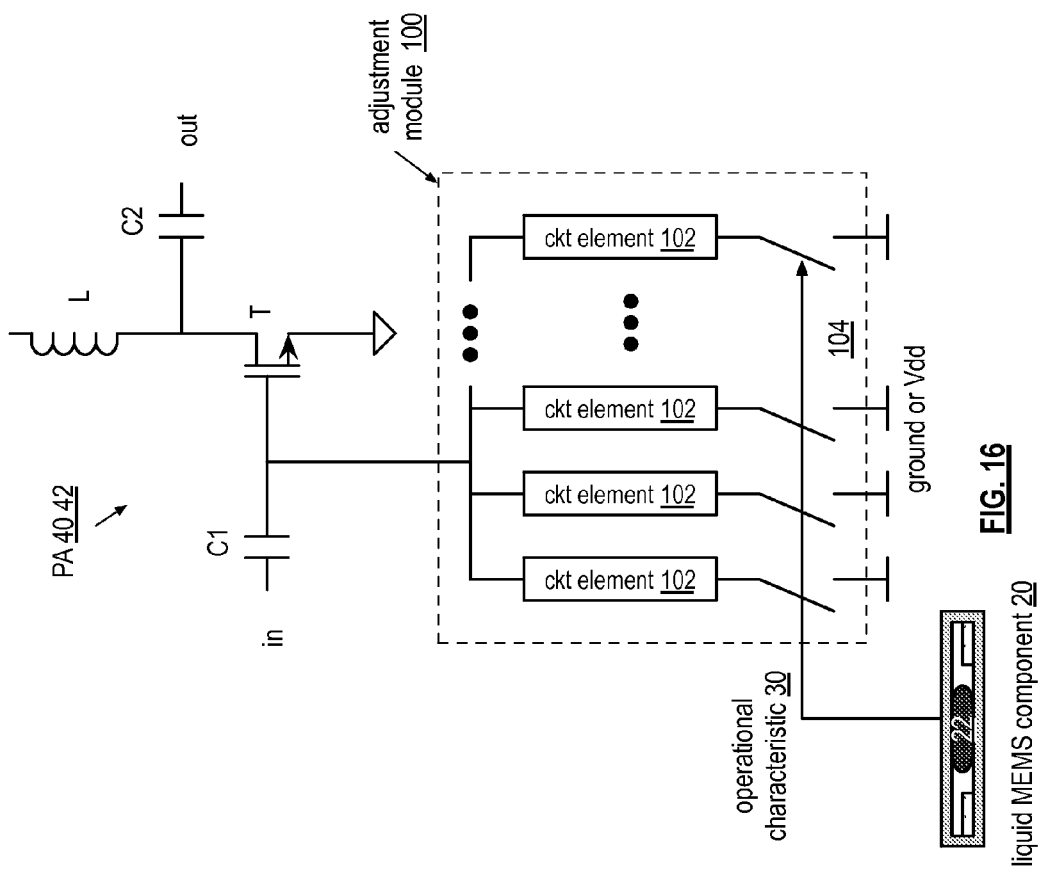
FIG. 16 is a schematic block diagram of another embodiment of a power amplifier in accordance with the present invention.

FIG. 16 is a schematic block diagram of another embodiment of a power amplifier 40-42 that includes a transistor (T), a load (which is represented as an inductor L), an input capacitor (C1), an output capacitor (C2), and an adjustment module 100. The adjustment module 100 includes a plurality of circuit elements 102 (e.g., current sources, capacitors, and/or resistors) and a plurality of switches 104. When the operational characteristic 30 of the one or more liquid MEMS components 20 changes, various combinations of the plurality of switches 104 are closed such that the plurality of circuit elements 102 provides varying component values to adjust gain and/or bias current of the power amplifier 40-42.

Figure 17:
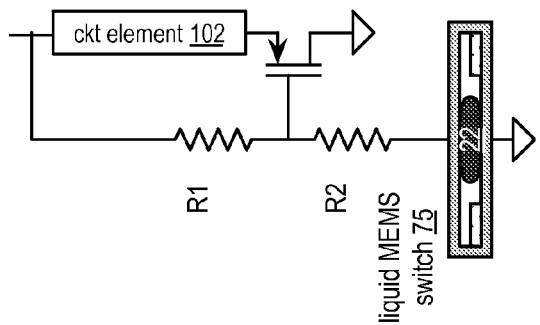
FIG. 17 is a schematic block diagram of an embodiment of a cell of an adjustment module in accordance with the present invention.

FIG. 17 is a schematic block diagram of an embodiment of a representative cell of the adjustment module 100 that includes the circuit element 102, a resistor divider (R1 and R2), a transistor as the switch 104, and a liquid MEMS switch 75. In this embodiment, the liquid MEMS component 20 includes a plurality of liquid MEMS switches 75 (one for each cell) with different properties of the droplet 22 such that they make and brake contact at different temperatures. Note that when the circuit element is a current source, the bias current of the power amplifier is being adjusted and when the circuit element is a capacitor, the gain of the power amplifier is being adjusted.

Figure 18:
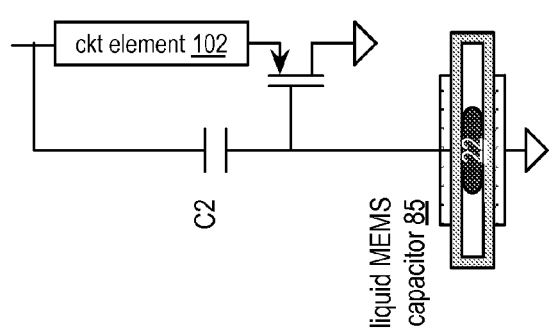
FIG. 18 is a schematic block diagram of another embodiment of a cell of an adjustment module in accordance with the present invention.

FIG. 18 is a schematic block diagram of another embodiment of a cell of an adjustment module a representative cell of the adjustment module 100 that includes the circuit element 102, a capacitor (C2), a transistor as the switch 104, and a liquid MEMS capacitor 85. In this embodiment, the liquid MEMS component 20 includes a plurality of liquid MEMS capacitors 85 (one for each cell) with different properties of the droplet 22 such that they have different capacitances at different temperatures.

Figure 19:
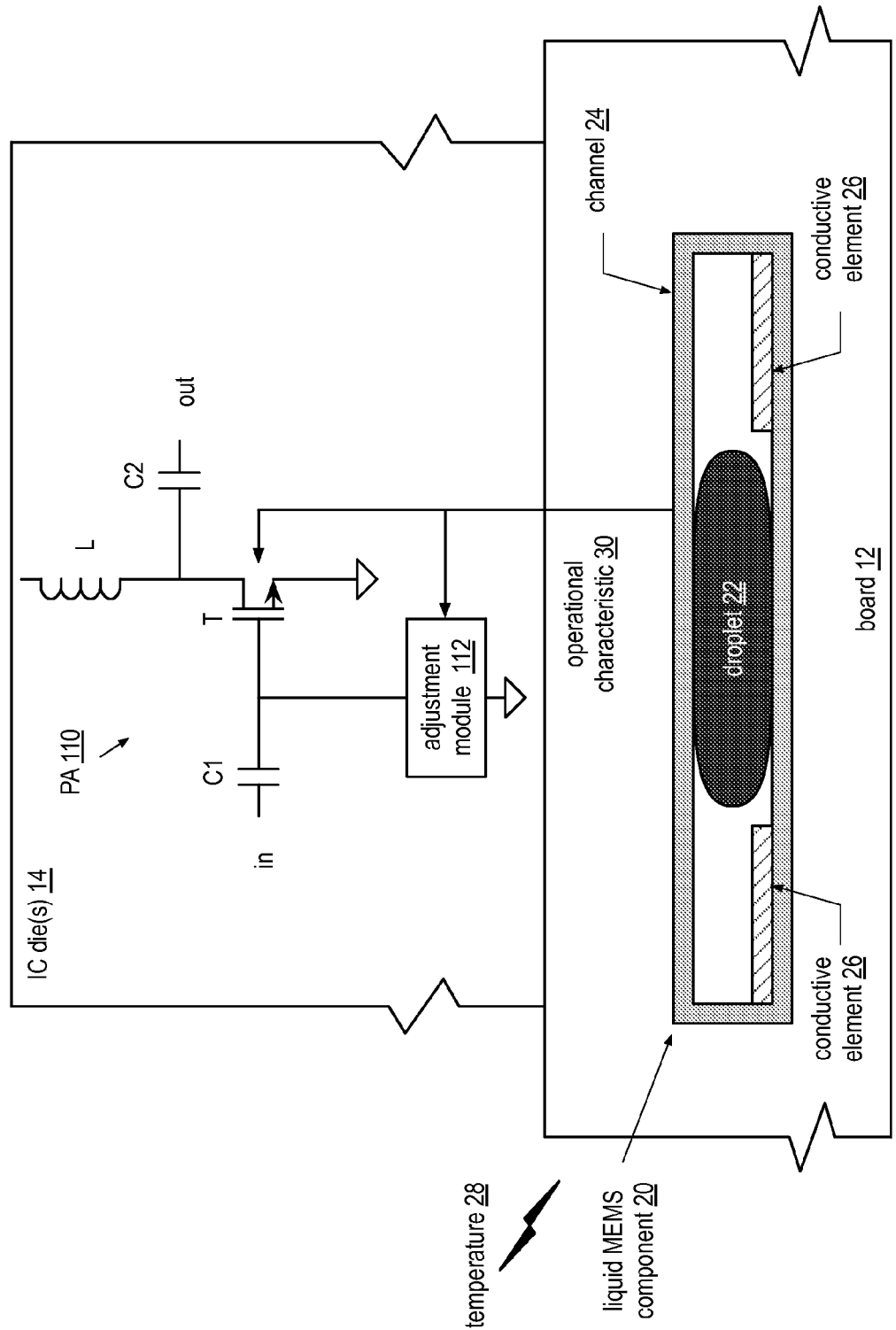
FIG. 19 is a schematic block diagram of another embodiment of a radio circuit in accordance with the present invention.

FIG. 19 is a schematic block diagram of another embodiment of a radio circuit that includes the board 12 and one or more IC dies 14. The board 12 supports the IC die(s) 14 and includes one or more liquid MEMS components 20. The IC die(s) 14 include a self-tuning power amplifier 110 that includes a transistor (T), a load (which is represented as an inductor L), an input capacitor (C1), an output capacitor (C2), and an adjustment module 112. A liquid MEMS component 20 includes a liquid droplet 22, a channel 24, and one or more conductive elements 26.

In an example of operation, an operational property of the power amplifier 110 is adjusted based on an operational characteristic 30 of the one or more liquid MEMS components 20 changing in response to a change in temperature. FIGS. 20-23 illustrate various examples of changing an operational property of the power amplifier 110 in response to the changing operational characteristic 30.

Figure 20:
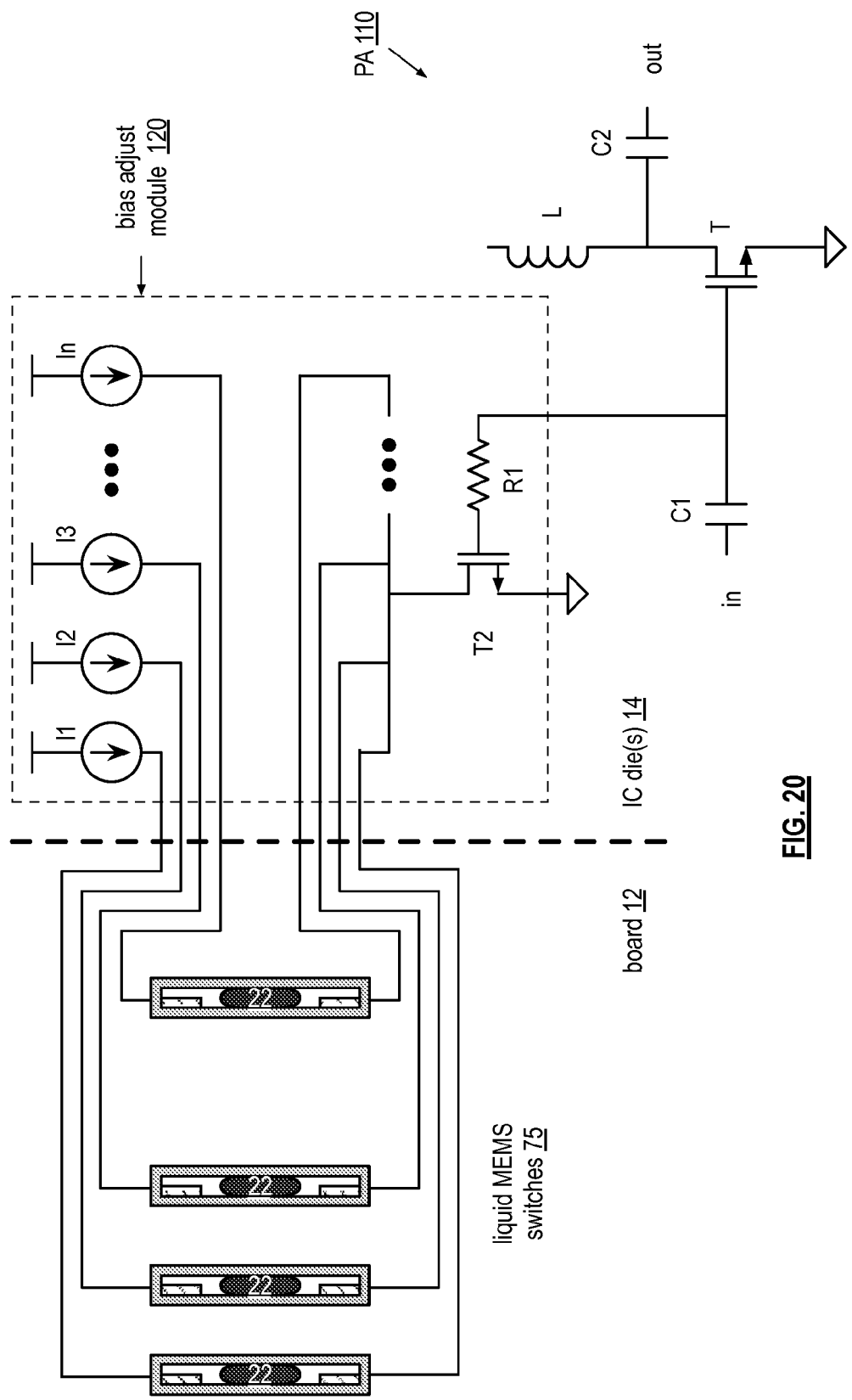
FIG. 20 is a schematic block diagram of another embodiment of a power amplifier in accordance with the present invention.

FIG. 20 is a schematic block diagram of another embodiment of a self-tuning power amplifier 110 that includes a transistor (T), a load (which is represented as an inductor L), an input capacitor (C1), an output capacitor (C2), a bias adjust module 120 as the adjustment module 112, and a plurality of liquid MEMS switches 75 as the one or more liquid MEMS components 20. The bias adjust module 120 includes a plurality of current sources I1-In, a reference transistor T2, and a resistor R1.

In an example of operation, each of the liquid MEMS switches 75 includes droplets 22 that have different properties such that they each respond differently to changing temperatures. As such, each of liquid MEMS switches 75 makes and brakes connection at different temperatures such that the bias adjust module 120 provides different bias currents at the different temperatures.

Figure 21:
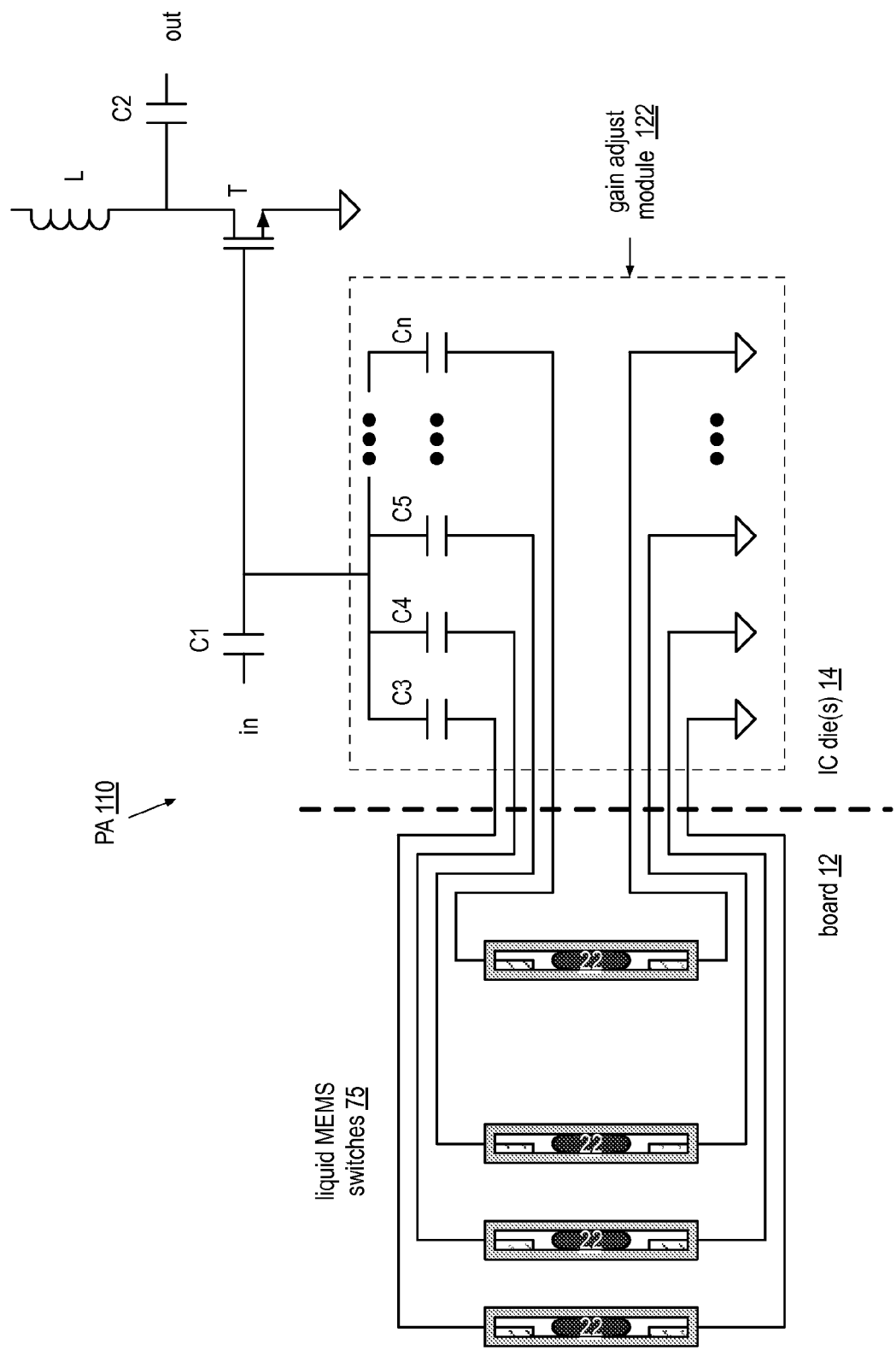
FIG. 21 is a schematic block diagram of another embodiment of a power amplifier in accordance with the present invention.

FIG. 21 is a schematic block diagram of another embodiment of a self-tuning power amplifier 110 that includes a transistor (T), a load (which is represented as an inductor L), an input capacitor (C1), an output capacitor (C2), a gain adjust module 122 as the adjustment module 112, and a plurality of liquid MEMS switches 75 as the one or more liquid MEMS components 20. The gain adjust module 122 includes a plurality of capacitors C3-Cn, and ground connections.

In an example of operation, each of the liquid MEMS switches 75 includes droplets 22 that have different properties such that they each respond differently to changing temperatures. As such, each of liquid MEMS switches 75 makes and brakes connection at different temperatures such that the gain adjust module 122 provides different gains (e.g., ratio of C1 to capacitance of the gain adjust module 122) at the different temperatures.

Figure 22:
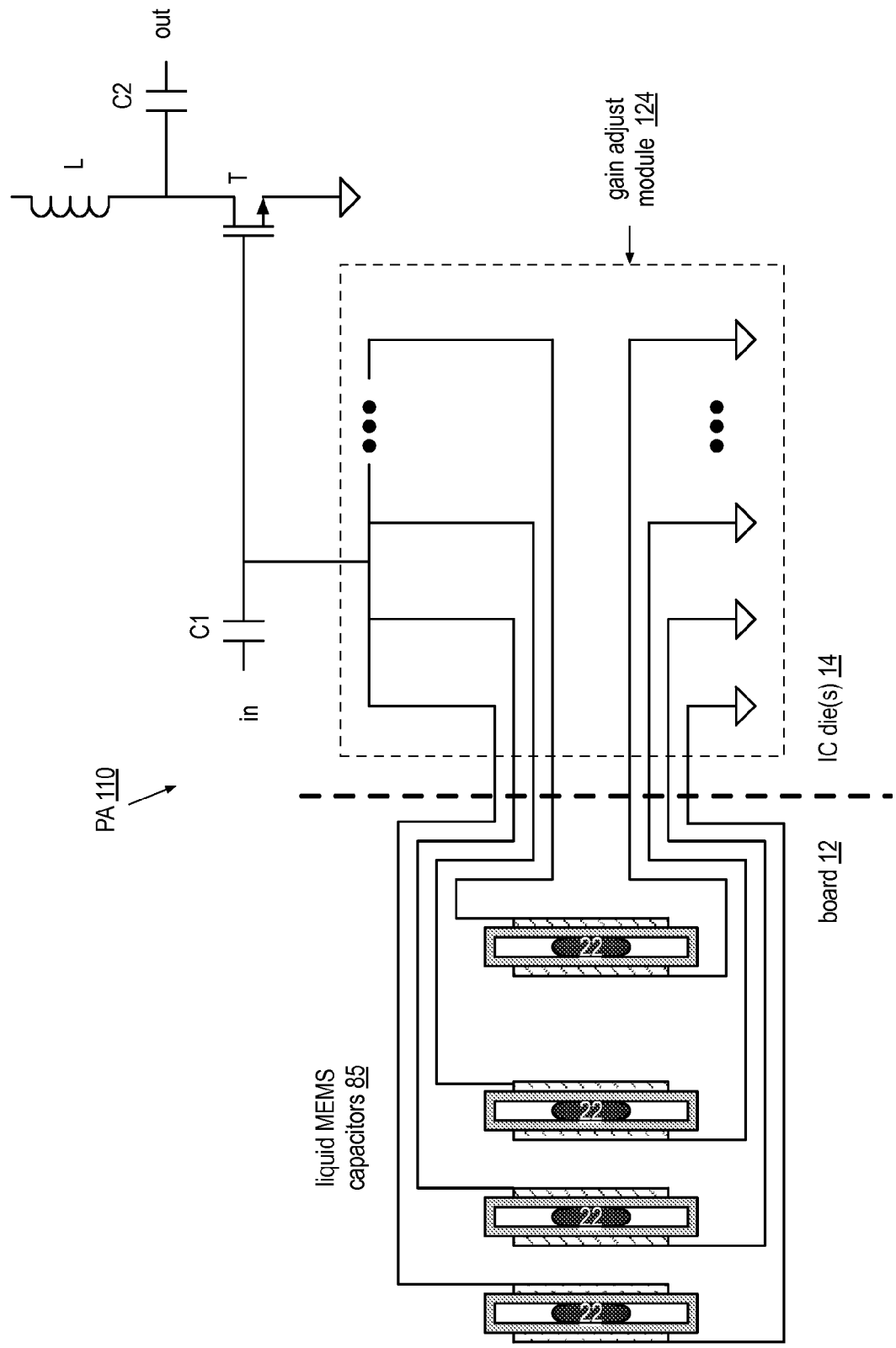
FIG. 22 is a schematic block diagram of another embodiment of a power amplifier in accordance with the present invention.

FIG. 22 is a schematic block diagram of another embodiment of a self-tuning power amplifier 110 that includes a transistor (T), a load (which is represented as an inductor L), an input capacitor (C1), an output capacitor (C2), a gain adjust module 124 as the adjustment module 112, and a plurality of liquid MEMS capacitors 85 as the one or more liquid MEMS components 20. The gain adjust module 124 includes a plurality of capacitors connections and ground connections.

In an example of operation, each of the liquid MEMS capacitors 85 includes droplets 22 that have different properties such that they each respond differently to changing temperatures. As such, each of liquid MEMS capacitors 85 varies its capacitance different at different temperatures such that the gain adjust module 124 provides different gains (e.g., ratio of C1 to capacitance of the liquid MEMS capacitors 85) at the different temperatures. In an alternative embodiment, a single liquid MEMS capacitor 85 may be used to adjust the gain of the power amplifier 110.

Figure 23:
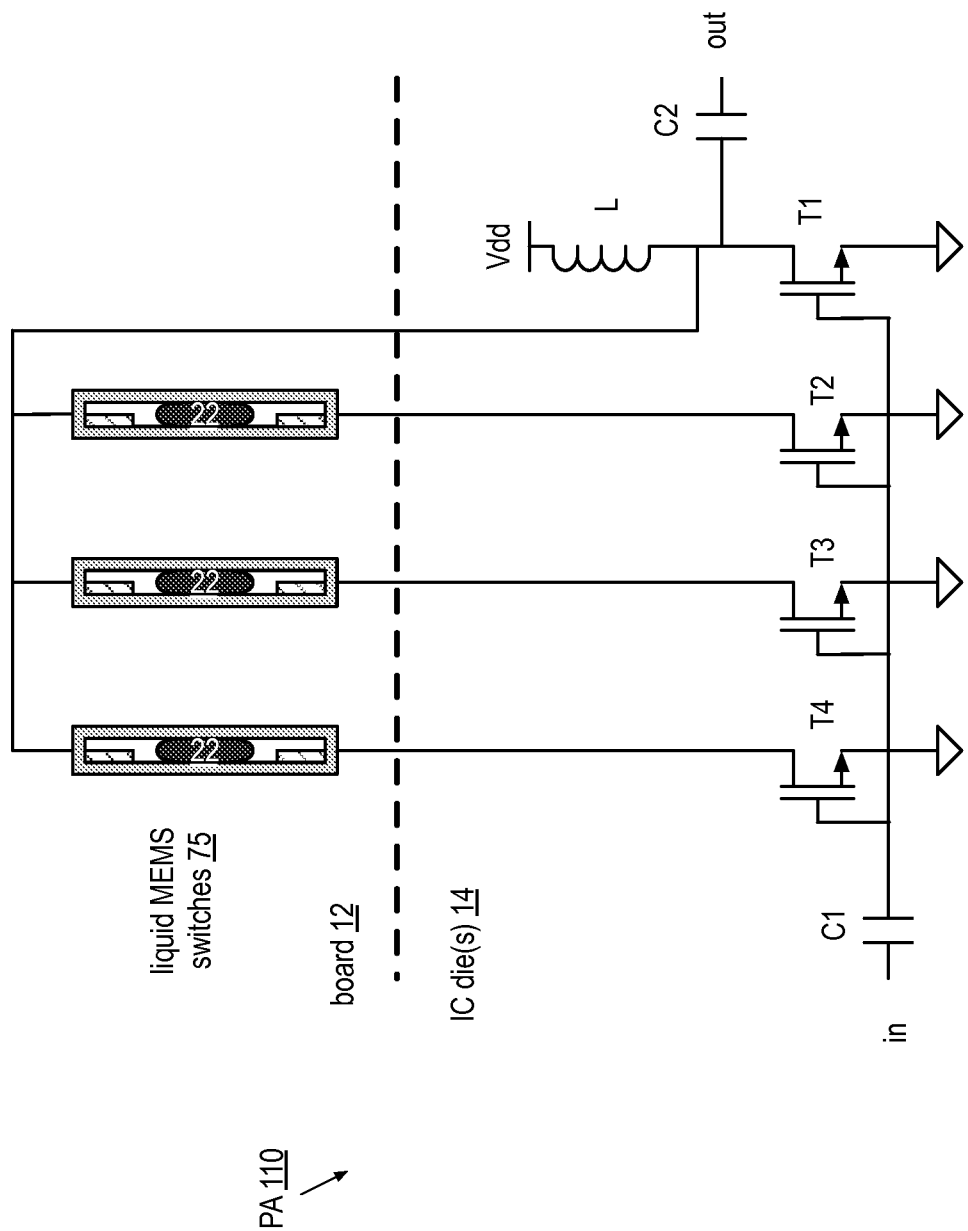
FIG. 23 is a schematic block diagram of another embodiment of a power amplifier in accordance with the present invention.

FIG. 23 is a schematic block diagram of another embodiment of a self-tuning power amplifier 110 that includes an input transistor (T1), a plurality of selectable input transistors (T2-T4), a load (which is represented as an inductor L), an input capacitor (C1), an output capacitor (C2), and a plurality of liquid MEMS switches 75 as the one or more liquid MEMS components 20.

In an example of operation, each of the liquid MEMS switches 75 includes droplets 22 that have different properties such that they each respond differently to changing temperatures. As such, each of liquid MEMS switches 75 makes and brakes connection at different temperatures such that different combinations of the transistors are active as an input transistor of the self-tuning power amplifier 110 at the different temperatures. The different combination of transistors provides different combinations of transistor properties (e.g., on resistance, gain, drain current, characteristic curves, etc.).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A radio circuit comprises:
   an adjustable radio frequency (RF) front-end module on an integrated circuit (IC) die, wherein the adjustable RF front-end module adjusts processing of an inbound or an outbound RF signal based on a compensation signal;
   a liquid micro-electro-mechanical system (MEMS) component on a board, wherein the liquid MEMS component includes:
      a channel within the board;
      a liquid droplet contained within the channel; and
      one or more conductive elements proximal to the channel, wherein, when temperature of the radio circuit varies, the liquid droplet changes with respect to the one or more conductive elements thereby changing an operational characteristic of the liquid MEMS component to produce at least one corresponding output signal that indicates an operating temperature of the radio circuit; and
   a processing module on the IC die, wherein the processing module is operable to receive the at least one corresponding output signal and to process the output signal to generate the compensation signal.

2. The radio circuit of claim 1, wherein the adjustable RF front-end module comprises:
   one or more power amplifiers;
   one or more receive-transmit isolation modules;
   one or more antenna tuning units; and
   a frequency band switch, wherein the adjusting the processing of the inbound or the outbound RF signal includes one or more of:
      adjusting an operational property of the one or more power amplifiers;
      changing from a first channel to a second channel within a frequency band; and
      changing from a first frequency band to a second frequency band.

3. The radio circuit of claim 2, wherein a power amplifier of the one or more power amplifiers comprises:
   a load;
   an output capacitor coupled to the load;
   a transistor coupled to the load and the output capacitor;
   an input capacitor coupled to the transistor; and
   an adjustable module coupled to the input capacitor and the transistor, wherein the operational property of the power amplifier is adjusted via the adjustment module in response to the compensation signal.

4. The radio circuit of claim 1 further comprises:
   a baseband processing module on the IC die, wherein the baseband processing module is operable to:
      convert outbound data into an outbound symbol stream in accordance with one of a plurality of communication protocols;
      convert an inbound symbol stream into inbound data in accordance with the one of the plurality of communication protocols; and
      change to another one of the plurality of communication protocols based on the compensation signal.

5. The radio circuit of claim 1 further comprises:
   a baseband processing module on the IC die, wherein the baseband processing module is operable to:
      convert outbound data into an outbound symbol stream having Cartesian coordinates;
      convert an inbound symbol stream having the Cartesian coordinates into inbound data; and
      change conversion from Cartesian coordinates to Polar coordinates based on the compensation signal.

6. The radio circuit of claim 1, wherein the liquid MEMS component comprises one or more of:
   a liquid MEMS switch;
   a liquid MEMS capacitor;
   a plurality of liquid MEMS switches; and
   a plurality of liquid MEMS capacitors.

7. The radio circuit of claim 1 further comprises:
   the board supporting the IC die, wherein the board includes one of a printed circuit board (PCB), an integrated circuit (IC) package substrate, and a redistribution layer (RDL) of a PCB or of an IC package substrate.

8. A radio circuit comprises:
   one or more liquid micro-electro-mechanical system (MEMS) components on a board, wherein a liquid MEMS component of the one or more liquid MEMS components includes:
      a channel within the board;
      a liquid droplet contained within the channel;
      one or more conductive elements proximal to the channel, wherein, when temperature of the radio circuit varies, the liquid droplet changes with respect to the one or more conductive elements thereby changing an operational characteristic of the liquid MEMS component; and
      an output configured to produce at least one output signal that indicates an operating temperature of the radio circuit; and
   an adjustable radio frequency (RF) front-end module on an integrated circuit (IC) die, wherein the adjustable RF front-end module adjusts processing of an inbound or an outbound RF signal based on the at least one output signal received via the output.

9. The radio circuit of claim 8, wherein the one or more liquid MEMS components comprises one or more of:
a liquid MEMS switch;
a liquid MEMS capacitor;
a plurality of liquid MEMS switches; and
a plurality of liquid MEMS capacitors.

10. The radio circuit of claim 8 further comprises:
the board supporting the IC die, wherein the board includes one of a printed circuit board (PCB), an integrated circuit (IC) package substrate, and a redistribution layer (RDL) of a PCB or of an IC package substrate.

11. The radio circuit of claim 8, wherein the adjustable RF front-end module comprises:
one or more power amplifiers;
one or more receive-transmit isolation modules;
one or more antenna tuning units; and
a frequency band switch, wherein the adjusting the processing of the inbound or the outbound RF signal includes one or more of:
adjusting an operational property of the one or more power amplifiers;
changing from a first channel to a second channel within a frequency band; and
changing from a first frequency band to a second frequency band.

12. The radio circuit of claim 11, wherein a power amplifier of the one or more power amplifiers comprises:
a load;
an output capacitor coupled to the load;
a transistor coupled to the load and the output capacitor;
an input capacitor coupled to the transistor; and
an adjustable module coupled to the input capacitor and the transistor, wherein the operational property of the power amplifier is adjusted via the adjustment module in response to the operational characteristics of the one or more liquid MEMS components changing.

13. The radio circuit of claim 12, wherein the adjustment module comprises:
a plurality of circuit elements; and (e.g., current sources, capacitors, resistors)
a plurality of switches operably coupled to the plurality of circuit elements, wherein, as the operational characteristics of the one or more liquid MEMS components changes, various combinations of the plurality of switches are closed such that the plurality of circuit elements provides varying component values as the operational characteristics of the one or more liquid MEMS components changes.

14. A self-tuning power amplifier comprises:
one or more integrated circuit (IC) dies that support:
a load;
an output capacitor coupled to the load;
a transistor coupled to the load and the output capacitor;
an input capacitor coupled to the transistor; and
an adjustable module coupled to the input capacitor and the transistor, wherein the adjustment module is coupled to one or more liquid micro-electro-mechanical system (MEMS) components and wherein an operational property of the power amplifier is adjusted based on at least one output signal received from the one or more liquid MEMS components; and
a board that supports the one or more IC dies and supports the one or more liquid MEMS components, wherein a liquid MEMS component of the one or more liquid MEMS components includes:
a channel within the board;
a liquid droplet contained within the channel;
one or more conductive elements proximal to the channel, wherein, when temperature of the self-tuning power amplifier varies, the liquid droplet changes with respect to the one or more conductive elements thereby changing the operational characteristic of the liquid MEMS component; and
an output configured to produce the at least one output signal that indicates an operating temperature of the self-tuning power amplifier.

15. The self-tuning power amplifier of claim 14, wherein the adjustment module comprises:
a bias adjust module that includes:
a plurality of current sources; and
a reference transistor;
wherein the one or more liquid MEMS components includes a plurality of liquid MEMS switches coupled to the plurality of current sources, wherein liquid MEMS switches of the plurality of liquid MEMS switches make and brake connection at different temperatures such that the bias adjust module provides different bias currents at the different temperatures.

16. The self-tuning power amplifier of claim 14, wherein the adjustment module comprises:
a gain adjust module that includes a plurality of capacitors, wherein the one or more liquid MEMS components includes a plurality of liquid MEMS switches coupled to the plurality of capacitors, wherein liquid MEMS switches of the plurality of liquid MEMS switches make and brake connection at different temperatures such that the gain adjust module provides different capacitances at the different temperatures.

17. The self-tuning power amplifier of claim 14, wherein the adjustment module comprises:
a gain adjust module that includes one or more electrical connections, wherein the one or more liquid MEMS components includes one or more liquid MEMS capacitors coupled to the one or more electrical connections, wherein capacitance of the one or more liquid MEMS capacitors changes as the temperature of the self-tuning power amplifier changes thereby changing gain of the self-tuning power amplifier.

18. The self-tuning power amplifier of claim 14, wherein the adjustment module comprises:
a gain adjust module that includes:
one or more capacitors; and
one or more electrical connections;
wherein the one or more liquid MEMS components includes one or more liquid MEMS switches coupled to the one or more capacitors and includes one or more liquid MEMS capacitors coupled to the one or more electrical connections.

19. The self-tuning power amplifier of claim 14 further comprises:
a plurality of transistors on the one or more IC dies, the plurality of transistors includes the transistor; and
a plurality of liquid MEMS switches on the board, wherein the plurality of liquid MEMS switches is coupled to the plurality of transistors, wherein liquid MEMS switches of the plurality of liquid MEMS switches make and brake connection at different temperatures such that different combinations of the plurality of transistors are active as an input transistor of the self-tuning power amplifier at the different temperatures.

20. The self-tuning power amplifier of claim 14, wherein the board comprises:

a printed circuit board (PCB);
an integrated circuit (IC) package substrate; and
a redistribution layer (RDL) of a PCB or of an IC package substrate.

* * * * *